US012265266B2

(12) United States Patent
Theuerkorn et al.

(10) Patent No.: US 12,265,266 B2
(45) Date of Patent: Apr. 1, 2025

(54) FIBER OPTIC CONNECTORS HAVING A SEALING MEMBRANE DISPOSED ON THE CONNECTOR HOUSING

(71) Applicant: Corning Research & Development Corporation, Corning, NY (US)

(72) Inventors: Thomas Theuerkorn, Hickory, NC (US); Christopher Robin Towery, Corning, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 235 days.

(21) Appl. No.: 17/952,737

(22) Filed: Sep. 26, 2022

(65) Prior Publication Data

US 2023/0100450 A1  Mar. 30, 2023

Related U.S. Application Data

(60) Provisional application No. 63/249,855, filed on Sep. 29, 2021.

(51) Int. Cl.
*G02B 6/38* (2006.01)
(52) U.S. Cl.
CPC ......... *G02B 6/3849* (2013.01); *G02B 6/3879* (2013.01)
(58) Field of Classification Search
CPC .............................. G02B 6/3879; G02B 6/3849
See application file for complete search history.

(56) References Cited

U.S. PATENT DOCUMENTS

| 6,076,976 A | 6/2000 | Kidd |
| 6,848,834 B1 | 2/2005 | Roehrs et al. |
| 8,998,503 B2 | 4/2015 | Barnette, Jr. et al. |
| 9,207,407 B2 | 12/2015 | Barnette, Jr. et al. |
| 9,411,110 B2 | 8/2016 | Barnette, Jr. et al. |
| 10,537,255 B2 | 1/2020 | Eberle et al. |

(Continued)

FOREIGN PATENT DOCUMENTS

EP  0320249 B1  8/1993

OTHER PUBLICATIONS

European Patent Application No. 22196266.5, Extended European Search Report dated Feb. 1, 2023; 8 pages; European Patent Office.

(Continued)

*Primary Examiner* — Sung H Pak
(74) *Attorney, Agent, or Firm* — Michael E. Carroll, Jr.

(57) ABSTRACT

Fiber optic connectors having a sealing membrane such as a foil or the like disposed on the front end of the connector housing for inhibiting dirt, debris or dust from reaching a ferrule end face are disclosed. The fiber optic connectors may have one or more ferrules with a mating end face that is located rearward of a front end of a connector housing of the fiber optic connector. The sealing membrane is disposed on the front end about a perimeter of the connector housing for inhibiting contaminants from reaching the one or more mating end faces of the respective ferrules until the fiber optic connector is desired to be mated. The sealing membrane is quick and easy to remove and/or pierce, thereby allowing optical mating of the fiber optic connector while providing single-use contaminant protection beforehand.

27 Claims, 1 Drawing Sheet

(56) References Cited

U.S. PATENT DOCUMENTS

| | | |
|---|---|---|
| 11,054,585 B2 | 7/2021 | Hikosaka |
| 2003/0235372 A1 | 12/2003 | Schott et al. |
| 2005/0185913 A1 | 8/2005 | Inamoto |
| 2015/0205055 A1 | 7/2015 | Barnette, Jr. et al. |
| 2016/0349459 A1* | 12/2016 | Collier ................ G02B 6/3849 |
| 2017/0299827 A1 | 10/2017 | Pelletier |
| 2018/0045892 A1 | 2/2018 | Zhong et al. |
| 2020/0257055 A1 | 8/2020 | Beach et al. |
| 2021/0072465 A1 | 3/2021 | Philippe et al. |

OTHER PUBLICATIONS

International Search Report and Written Opinion of the International Searching Authority; PCT/US22/44997; mailed on Jan. 2, 2022, 13 pages; European Patent Office.

* cited by examiner

FIBER OPTIC CONNECTORS HAVING A SEALING MEMBRANE DISPOSED ON THE CONNECTOR HOUSING

CROSS-REFERENCES TO RELATED APPLICATIONS

This application claims the benefit of priority of U.S. Provisional Application Ser. No. 63/249,855 filed on Sep. 29, 2021, the content of which is relied upon and incorporated herein by reference in its entirety.

FIELD

The disclosure is directed to fiber optic connectors having one or more ferrules with an end face recessed rearward of a front end of a connector housing and a sealing membrane such as a foil or the like disposed on the front end of the connector housing for inhibiting dirt, debris or dust from the ferrule end face until the connector is ready for mating.

BACKGROUND

Optical fiber is increasingly being used for a variety of applications, including but not limited to broadband voice, video, and data transmission in a variety of new and expanding applications. As bandwidth demands increase optical fiber is migrating deeper into these new communication networks such as fiber inside the premises applications and in-vehicle optical networks and the like. As optical fiber extends deeper into these communication networks there exist a need for quickly and easily making optical connections in a quick and easy manner for the demands of these new application spaces.

Fiber optic connectors were developed for making one or more plug and play optical connections using a suitable fiber optic connector for the given application. Fiber optic connectors provide a node for mating and demating to the optical network and provide the flexibility of locating the connection points in convenient locations for efficient network assembly, design and/or deployment. Conventional fiber optic connectors used for telecommunications, FTTx and 5G applications typically have a dust cap attached directly over a portion of the ferrule of the fiber optic connector and/or the dust cap may screw or snap onto a portion of the fiber optic connector for inhibiting contaminants such as dust, dirt or debris from reaching the mating interface of the fiber optic connector. Consequently, the fiber optic connectors remains relatively clean until the dust cap is removed for optical mating. However, even in this case the manufacturer may recommend that the mating interface is still cleaned before optical mating since contaminants may adversely impact the optical performance of the fiber optic connector.

As new applications emerge for the deployment of optical networks the requirements for these new applications may be different and/or have other considerations for the given application. Consequently, there exists an unresolved need for fiber optic connectors that maintain a clean mating interface of fiber optic connector before mating while also allow quick and easy deployment for the end user to quickly make an optical connection is a suitable manner.

SUMMARY

The disclosure is directed to fiber optic connectors (hereinafter "connector(s)") comprising a sealing membrane disposed on a front end of a connector housing with one or more ferrules disposed within a passageway of the connector housing and the optical interface of the one or more ferrules disposed rearward of the front end of the connector housing. The sealing membrane is separate component that is attached to the connector housing for protecting the optical surfaces of the connector.

One aspect of the disclosure is directed to a fiber optic connector comprising one or more ferrules, at least one optical fiber, a connector housing and a sealing membrane disposed on a front end about the perimeter of the connector housing for inhibiting contaminants from reaching the one or more ferrules. The sealing membrane may be removed from the connector housing for mating the fiber optic connector. The one or more ferrules each comprise a bore extending from a rear end into the respective one or more ferrules, and the ferrule comprise an optical interface disposed on the front end of the respective one or more ferrules. An optical fiber is disposed within the bore of each of the one or more ferrules. The connector housing comprises a passageway extending from a rear end to a front end with the front end comprising a perimeter, and the optical interface of each of the respective one or more ferrules are disposed within the passageway of the connector housing and located rearward of the front end.

Another aspect of the disclosure is directed to a fiber optic connector comprising one or more ferrules, at least one optical fiber, a connector housing and a sealing membrane comprising a foil disposed on a front end about the perimeter of the connector housing for inhibiting contaminants from reaching the one or more ferrules. The sealing membrane may be removed from the connector housing for mating the fiber optic connector. The one or more ferrules each comprise a bore extending from a rear end into the respective one or more ferrules, and the ferrule comprise an optical interface disposed on the front end of the respective one or more ferrules. An optical fiber is disposed within the bore of each of the one or more ferrules. The connector housing comprises a passageway extending from a rear end to a front end with the front end comprising a perimeter, and the optical interface of each of the respective one or more ferrules are disposed within the passageway of the connector housing and located rearward of the front end.

The disclosure is also directed to a method of making a fiber optic connector comprising a one-use sealing membrane for inhibiting contaminants from contacting an optical mating portion of the fiber optic connector before use. The fiber optic connector comprises one or more ferrules with each respective ferrule comprising a bore extending from a rear end into the respective ferrule and a front end having an optical interface, and at least one optical fiber disposed within the bore. A connector housing comprising a passageway extending from a rear end to a front end, and the front end comprising a perimeter, wherein the optical interface of each of the respective one or more ferrules is disposed within the passageway of the connector housing and located rearward of the front end of the connector housing. The method includes the step of applying a sealing membrane on the front end of the connector housing about the perimeter of the connector housing for inhibiting contaminants from reaching the at least one ferrule, wherein the sealing membrane may be removed from the connector housing for mating.

The sealing membrane is a separate component that may be attached to the connector housing in any suitable manner and may be hermetically sealed as desired or not. The sealing membrane may be any suitable material such as a foil, tape or polymer that is attached to the connector housing as desired. The ferrule of the fiber optic connector may be a physical contact ferrule or a lens-based ferrule as desired for the application. Additionally, the fiber optic connector may be a portion of a cable assembly.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
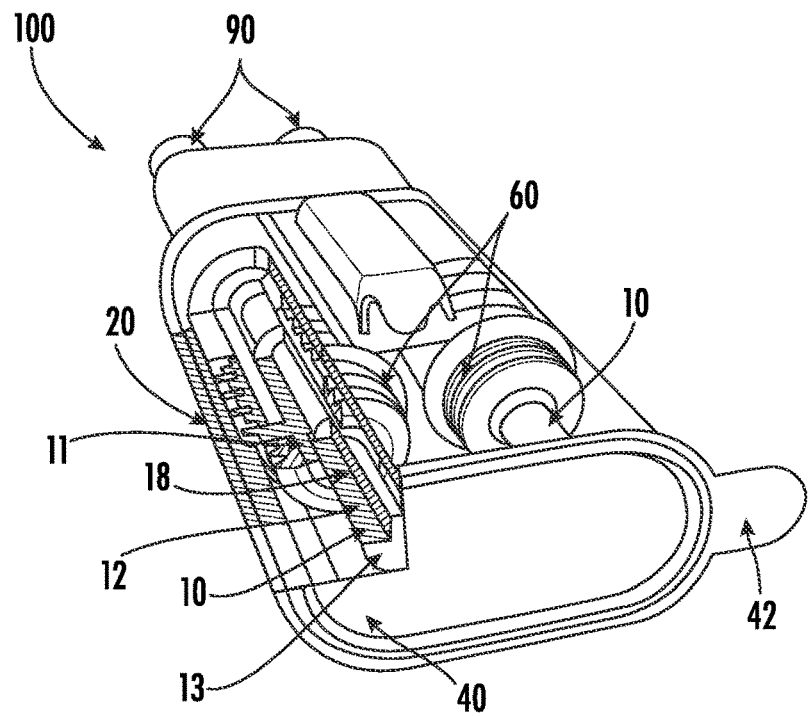
FIG. 1 is a front perspective partial sectional view of an explanatory fiber optic connector having a sealing membrane attached to a front end of the connector housing for inhibiting contaminants from reaching the optical interface prior to optical mating.

Reference will now be made in detail to the embodiments of the disclosure, examples of which are illustrated in the accompanying drawings. Whenever possible, like reference numbers will be used to refer to like components or parts.

The concepts disclosed are related to fiber optic connectors having a sealing membrane disposed on the front end of the connector housing for inhibiting contaminants from reaching the optical interface (e.g., the mating interface) prior to optical mating. The fiber optic connectors (hereinafter "connectors") disclosed comprise a connector housing where the optical interface of one or more ferrules is disposed within the passageway of the connector housing and rearward of the front end so that a sealing membrane is disposed on the front end about a perimeter of the connector housing for inhibiting contaminants from reaching one or more ferrules of the connector.

The sealing membrane is a separate component that may be attached to a perimeter of a connector housing in a suitable manner so that the sealing membrane provides environmental protection while intact. The sealing membranes disclosed are distinct from conventional dust caps since they are attached to the connector housing by swaging, adhesive or the like about a perimeter of the front end of the connector housing, thereby providing environmental protection until optical mating is desired. The sealing membrane concepts disclosed for fiber optic connectors also allow quick and easy removal and/or piercing of the sealing membrane for optical mating. For instance, the sealing membrane may be removed from the connector housing using one or more pull tabs on the sealing membrane or the sealing membrane may be pierced for providing access to the passageway of the connector housing for optical mating.

Still further, the concepts disclosed may be used with any suitable fiber optic connector such a plug fiber optic connector or a receptacle fiber optic connector. Generally speaking, the fiber optic connectors disclosed having the sealing membrane provide a one-use sealing feature for the fiber optic connector such as for in-vehicle applications or the like, thereby advantageously providing a fiber optical connector with quick and easy removal of the sealing membrane for building wiring harnesses without the need to dispose or maintain a dust cap in close proximity to the fiber optic connector for future use like the conventional fiber optic connectors.

Of course, the concepts disclosed may be used in other applications such as in-home networks or the like. For instance, the concepts disclosed herein may also be suitable for fiber optic networks such as for Fiber-to-the-location (FTTx) and 5G applications, and are equally applicable to other optical applications as well including indoor, industrial, wireless, or other suitable applications. Additionally, the concepts disclosed may be used with fiber optic connectors having any suitable footprint or construction. Various designs, constructions, or features for fiber optic connectors are disclosed in more detail with respect to explanatory embodiments as discussed herein and may be modified or varied as desired.

Figure 2:
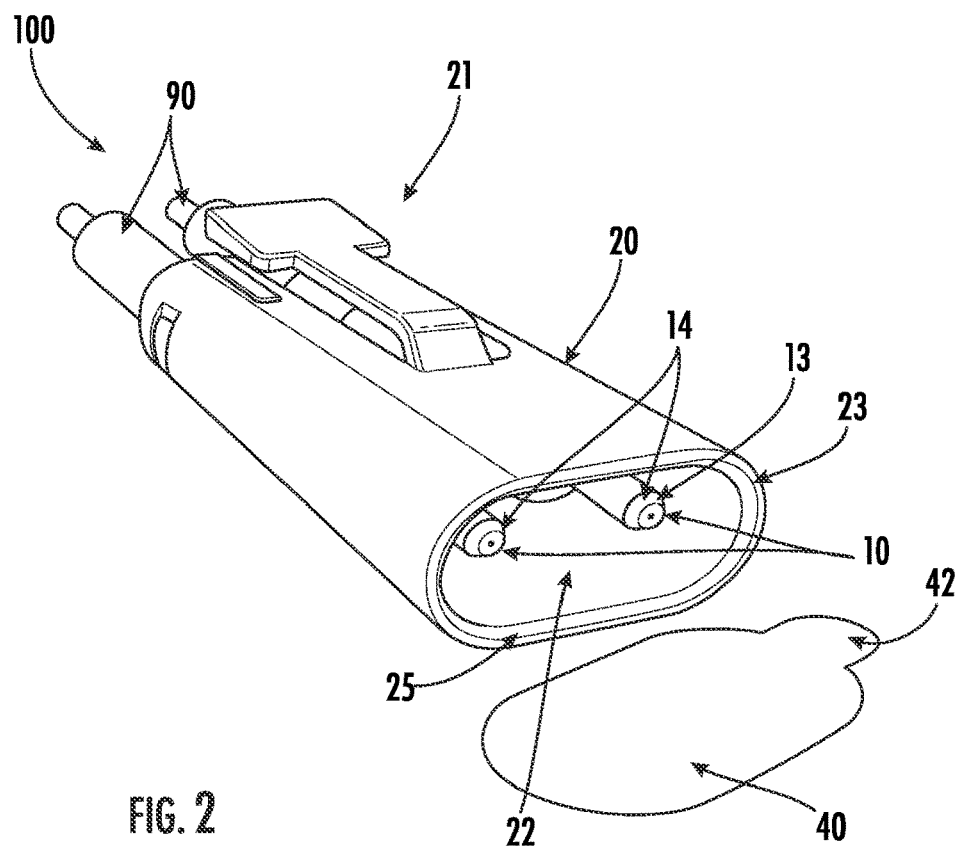
FIG. 2 shows the fiber optic connector of FIG. 1 with the sealing membrane removed from the front end of the connector housing.

FIG. 1 is a partial-sectional front perspective view of an explanatory fiber optic connector 100 having a sealing membrane 40 attached to a front end 23 of a connector housing 20 for inhibiting contaminants from reaching the optical interface 14 prior to optical mating of the fiber optic connector 100. FIG. 1 shows the connector housing 20 as transparent so that the construction of fiber optic connector 100 is visible. FIG. 2 shows the fiber optic connector 100 of FIG. 1 with the sealing membrane 40 removed from the front end 23 of the connector housing 20 so that the ferrules 10 are visible through the front end 23 of the connector housing 20. As depicted, the fiber optic connector 100 may be a portion of a cable assembly having one or more cables attached thereto.

Fiber optic connector 100 comprises one or more ferrules 10, at least one optical fiber 18, a connector housing 20, and a sealing member 40 disposed on the front end 23 about a perimeter 25 of the connector housing 20 for inhibiting contaminants from reaching each of the one or more ferrules 10. The sealing member 40 may be removed from the connector housing 20 for optical mating when desired.

Each of the one or more ferrules 10 comprise a bore 12 extending from a rear end 11 into the ferrule 10. The one or more ferrules 10 each comprise an optical interface 14 disposed at a front end 13 of the respective ferrule 10. At least one optical fiber 18 may be disposed within the bore 12 of each of the respective ferrules. Optical fiber 18 may be formed from any suitable material(s) such as a glass with one or more coatings or plastic optical fiber. Likewise, optical fiber 18 may be any suitable type such as multi-mode or single-mode with any suitable size for the optical core, cladding or coating for the fiber. In other embodiments, the optical fiber 18 may have a buffer layer to upsize the diameter and protect the optical fiber or be a portion of a fiber optic cable.

Ferrules 10 may have any suitable optical interface 14 desired. By way of explanation, the ferrule 10 may be configured a physical contact (PC) ferrule where the optical fiber 18 extends to the front end 13 of the ferrule 10 of the optical interface 14. If ferrule 10 is a physical contact ferrule, then the bore 12 extends from the rear end 11 to the front end 13 of the respective ferrule 10 so that the optical fiber 18 may extend to the front of the ferrule 10 for optical mating with a complimentary mating optical fiber/ferrule.

Alternatively, optical interface 14 of the fiber optic connector 100 may comprises a lens. For instance, the ferrule may comprise a suitable lens at the front end 13 of the ferrule 10. As an example, the ferrule may have a lens molded-in as part of the ferrule or a separate lens may be attached at the end of the ferrule. If ferrule 10 is a lens-based ferrule, then the bore typically stop short of the front end 13 of the ferrule and the optical fiber 18 cooperates with the lens at the front end 13 of the ferrule. Fiber optic connectors 100 may also use multi-fiber ferrules 10 if desired.

Connector housing 20 comprises a passageway 22 extending from a rear end 21 to the front end 23 with the front end 23 of the connector housing 20 comprising a perimeter 25. By way of example, the perimeter 25 of the connector housing 20 shown in FIGS. 1 and 2 has an oval racetrack shape, but the concepts may be used with connector housings 20 having any suitable perimeter shape at the front end such as round or the like. The optical interface 14 of each of the respective one or more ferrules is disposed within the passageway 22 of the connector housing 20 and located rearward of the front end 23 of the connector housing 20 as shown.

As shown in FIG. 1, sealing membrane 40 is disposed on the front end 23 about the perimeter 25 of the connector housing 20 for inhibiting contaminants from reaching each of the respective one or more ferrules 10 from the front end 23. When desired, the sealing membrane 40 may be removed from the connector housing 20 for optical mating such as shown in FIG. 2.

Sealing membrane 40 may be formed from any suitable material and is preferably selected from a material that is compatible with the material of the connector housing 20 for creating suitable attachment or bonding between the components for providing suitable environmental protection. The selection of material used for the sealing membrane 40 for the fiber optic connector 100 may also depend on the method used for attaching the sealing membrane 40 to the connector housing 20. Suitable means for attaching the sealing membrane 40 to the front end 23 of the connector housing 20 may include thermal swaging or adhesive attachment, but other means of attaching the sealing membrane 40 are possible according to the concepts disclosed.

By way of explanation, the sealing membrane 40 and connector housing 20 may be selected from same class of material if desired. By way of example and not limitation, it may be beneficial for a polypropylene (PP) sealing membrane 40 to be used when the connector housing 20 is formed from a PP. As another example, it may be beneficial to employ a thermoplastic elastomer (TPE) sealing membrane 40 with a connector housing 20 formed from a TPE. Likewise, using a polybutylene terephthalate (PBT) sealing membrane 40 may be useful with a connector housing 20 formed from a PBT such as VALOX™ or the like. Similarly, matching a Nylon sealing membrane 40 with a Nylon connector housing 20 may be beneficial. One suitable Nylon is a PA66, but other Nylon materials are possible according to the concepts disclosed. Of course, the materials of the sealing membrane and connector housing do not need to be from the same class of materials, but instead may have similar properties as desired.

By way of example, the sealing membrane 40 may be a foil, a tape or a polymer as desired. Likewise, the sealing membrane 40 may be hermetically sealed to the front end 23 of the connector housing 20 or not. Thermally swaging the sealing membrane 40 to the front end 23 of the perimeter of the connector housing 20 may be one useful method of attachment. Sealing membrane 40 could also be adhesively attached to the connector housing 20 about the perimeter 25 of the connector housing 20. For instance, a heat-activated adhesive may be used for attaching the sealing membrane 40 to the connector housing 20. Of course, other methods of attachment such as sonic welding or the like may also be possible.

Sealing membrane 40 may also comprise one or more pull tabs 42 for aiding the removal of the sealing membrane 40 from the connector housing 20. The sealing membrane 40 may provide a one-use sealing feature for the optical connector, thereby allowing a quick and easy assembly process for making the optical connection without the use of a conventional dust cap.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic connector comprising:
   one or more ferrules each comprising a bore extending from a rear end into the respective one or more ferrules, and comprising an optical interface disposed at a front end of each respective one or more ferrules;
   at least one optical fiber disposed within the bore of each of the respective one or more ferrules;
   a connector housing comprising a passageway extending from a rear end to a front end with the front end comprising a perimeter, wherein the optical interface of each of the respective one or more ferrules is disposed within the passageway of the connector housing and located rearward of the front end; and
   a sealing membrane disposed on the front end about the perimeter of the connector housing for inhibiting contaminants from reaching each of the respective one or more ferrules, wherein the sealing membrane is thermally swaged to the front end of the connector housing and the sealing membrane may be removed from the connector housing for mating.

2. The fiber optic connector of claim 1, the sealing membrane being hermetically sealed to the front end of the connector housing.

3. The fiber optic connector of claim 1, wherein the sealing membrane comprises a foil, a tape or a polymer.

4. The fiber optic connector of claim 1, wherein the sealing membrane further comprises one or more pull tabs for aiding the removal of the sealing membrane from the connector housing.

5. The fiber optic connector of claim 1, wherein the sealing membrane provides a one-use sealing feature for the fiber optic connector.

6. The fiber optic connector of claim 1, the one or more ferrules comprising a multi-fiber ferrule.

7. The fiber optic connector of claim 1, further comprising a sealing gasket disposed about a portion of each of the one or more ferrules.

8. The fiber optic connector of claim 1, wherein the optical interface comprises a lens.

9. The fiber optic connector of claim 1, wherein the optical interface comprises one or more ferrules that optically mate using physical contact.

10. The fiber optic connector of claim 1, the fiber optic connector being a portion of a cable assembly.

11. A fiber optic connector comprising:
one or more ferrules comprising a bore extending between a rear end into the respective one or more ferrules, and comprising an optical interface disposed at a front end of each respective one or more ferrules;
at least one optical fiber disposed within the bore of each of the respective one or more ferrules;
a connector housing comprising a passageway extending from a rear end to a front end with the front end comprising a perimeter, wherein the optical interface of each of the respective one or more ferrules is disposed within the passageway of the connector housing and located rearward of the front end; and
a sealing membrane comprising a foil disposed on the front end about the perimeter of the connector housing for inhibiting contaminants from reaching each of the respective one or more ferrules, wherein the sealing membrane is thermally swaged to the front end of the connector housing and the sealing membrane may be removed from the connector housing for mating.

12. The fiber optic connector of claim 11, the sealing membrane being hermetically sealed to the front end of the connector housing.

13. The fiber optic connector of claim 11, wherein the sealing membrane comprises a foil, a tape or a polymer.

14. The fiber optic connector of claim 11, wherein the sealing membrane further comprises one or more pull tabs for aiding the removal of the sealing membrane from the connector housing.

15. The fiber optic connector of claim 11, wherein the sealing membrane provides a one-use sealing feature for the fiber optic connector.

16. The fiber optic connector of claim 11, the one or more ferrules comprising a multi-fiber ferrule.

17. The fiber optic connector of claim 11, further comprising a sealing gasket disposed about a portion of each of the one or more ferrules.

18. The fiber optic connector of claim 11, wherein the optical interface comprises a lens.

19. The fiber optic connector of claim 11, wherein the optical interface comprises one or more ferrules that optically mate using physical contact.

20. The fiber optic connector of claim 11, the fiber optic connector being a portion of a cable assembly.

21. A method of making a fiber optic connector comprising a one-use sealing membrane for inhibiting contaminants from contacting an optical mating portion of the fiber optic connector before use, the fiber optic connector comprising:
one or more ferrules with each respective ferrule comprising a bore extending from a rear end into the respective ferrule and a front end having an optical interface, and at least one optical fiber disposed within the bore;
a connector housing comprising a passageway extending from a rear end to a front end, and the front end comprising a perimeter, wherein the optical interface of each of the respective one or more ferrules is disposed within the passageway of the connector housing and located rearward of the front end; and
applying a sealing membrane on the front end of the connector housing about the perimeter of the connector housing for inhibiting contaminants from reaching the at least one or more ferrules, wherein the sealing membrane is thermally swaged to the front end of the connector housing and may be removed from the connector housing for mating.

22. The method of claim 21, further comprising hermetically sealing the sealing membrane on the front end of the connector housing.

23. The method of claim 21, wherein the sealing membrane comprises a foil, a tape or a polymer.

24. The method of claim 21, wherein the sealing membrane provides a one-use sealing feature for the fiber optic connector.

25. The method of claim 21, further comprising placing a sealing gasket about a portion of each of the one or more ferrules.

26. The method of claim 21, wherein the optical interface comprises a lens.

27. The method of claim 21, the fiber optic connector being a portion of a cable assembly.

* * * * *